Patented Jan. 12, 1937

2,067,345

UNITED STATES PATENT OFFICE 2,067,345

PROCESS OF PURIFYING LIQUIDS

Claudius H. M. Roberts, San Marino, and Ralph L. Belshe, Long Beach, Calif., assignors to Petroleum Rectifying Company of California, Los Angeles, Calif., a corporation of California No Drawing. Application March 12, 1934
Serial No. 715,160

9 Claims. (Cl. 204—24)

Our invention relates to the art of purifying oily materials containing contaminating substances, these contaminating substances being of a more or less polar nature or being ionized materials.

The process and apparatus herein disclosed finds particular utility in the purification of oils to be used for electrical insulating purposes, such as dielectric oils used in transformers, circuit breakers, electric motors, and in other capacities. It is in this connection that specific application of our process will be described for the purpose of illustration, but it should not be understood that we are limited thereto, for, as will be hereinafter pointed out, the process herein involved, as well as the apparatus used, is clearly applicable to the treatment of other oily materials containing contaminating substances. In connection with the purification of a dielectric oil, the herein described process is applicable to the purification both of new oil and oil which has become contaminated through continued use.

The essential requirements which must be met in order to produce a satisfactory dielectric oil are that it possess satisfactorily high flash and fire points, a relatively low viscosity and low pour point, and that it have a high dielectric strength. The last requirement, other things being equal, is the most essential requirement of a good dielectric oil, and is a requirement to the fulfillment of which this invention is directed. The oil must also be free from reactive materials which cause its deterioration. This invention is also directed toward fulfillment of these requirements.

No matter how carefully the dielectric oil is made, nor how perfectly it meets the requirements above set forth, in service it inevitably deteriorates, this deterioration being usually due to the formation in, or absorption by, the oil of materials which cause it to become unsatisfactory for use in dielectric capacities. It is also an object of this invention to provide for repurification of deteriorated dielectric oil so as to make it satisfactory for continued use.

The ingredients in dielectric oil which make it unsatisfactory for electrical insulating purposes and for withstanding electrical stress are substances which may originally be present in the oil, or which may have been absorbed by the oil during use, or which may have been produced in the oil due to reactions induced by the electrical stress to which the oil is subjected in use. Such substances are of a polar nature and may be broadly classed, from their physico-chemical properties, as ionized or ionizable compounds. They are recognizable in the oil due to their effects in decreasing the resistivity, increasing the dielectric constant, and decreasing the dielectric strength of the oil. Conversely, a satisfactory dielectric oil is one which contains none or a minimum of substances having these properties. It is one purpose of this invention to provide a process for removing such contaminating materials, either from deteriorated oil or from oil which is being purified for use as a dielectric oil.

There are in existence and in commercial use two processes for reclamation and repurification of deteriorated dielectric oil. These are very efficient for the purpose, but require considerable equipment and materials for their efficient use. One process makes use of a high-speed centrifuge, either with or without a filter press. The other process uses a filter press equipped with a special grade of blotting paper for absorbing water and filtering out the impurities. Both of these processes require expensive equipment and are not well adapted to the requirements of handling small amounts of oil. It is a further purpose of our invention to provide a process suitable for handling either small quantities or oil or large quantities of oil, and for purifying this oil either by the use of a batch process or a continuous process or a combined batch and continuous process without the necessity of resorting to expensive and delicate machine equipment and with a minimum outlay for equipment and operating supplies.

Other objects of the invention reside in the application of these principles to the purification of other oily materials, it being understood that the remarks herein contained with regard to the purification of a dielectric oil are equally applicable to the purification of other oily material.

Two factors are important in the successful purification of oil by the herein disclosed processes, the relative importance of these factors depending upon the particular oil undergoing purification. The first factor involved is that of testing the oily material to be purified in order to determine the nature of the contaminating constituents, and choosing a suitable adsorbent having suitable physico-chemical properties bearing a certain relation to those of the impurities to be removed and to the liquid to be purified, as will be hereinafter set forth. The second important factor is the adjustment of adsorption time according to whether the impurities consist of ionized materials or polar molecule materials or both.

Briefly, we have discovered that the undesirable substances in an oily material may be completely removed by a process of contact adsorption, followed by filtration either through an ordinary filter press equipped with ordinary filter paper or through some other simple filter device. We have found that the criterion for selection of the most suitable adsorbent material, irrespective of whether dielectric oil or other oily material is to be purified, is as follows. When one liquid is intimately admixed with another liquid with which it is relatively non-miscible, or with a finely divided solid which is relatively insoluble in the liquid, certain materials in the liquid phase preferentially concentrate at the interface between the two phases. This concentration is what has previously been called contact adsorption. Thus, if an adsorbent is added to the contaminated oily material, certain of the contaminating materials will preferentially concentrate at the interface. Thus, assuming that a given adsorbent is added, the contaminating constituents in the liquid phase which adsorb at the interface are those which are most similar in properties to the properties of the adsorbent utilized. Thus, if the added adsorbent material consists of a relatively non-polar substance (or mixture of such substances), the contaminating materials preferentially adsorbed from the liquid to be purified will be the least polar materials present in that liquid. Conversely, if the added material consists of a highly polar substance (or mixture of such substances), the preferentially adsorbed contaminating substances will be the most polar substances present in the liquid to be purified. The term "polar substances" as herein expressed includes ions (particles carrying a net charge) as well as polar molecules (particles carrying charges of opposite sign at opposed portions thereof, the net charge being zero).

Thus, for most efficient treatment it becomes important to rather definitely ascertain the properties of the contaminating substances which it is desired to remove. The determination of whether or not these substances are of a highly polar or relatively non-polar character can be readily made in any well-known manner. Similarly, if not already known, the determination of the polar character of the adsorbent can be experimentally determined. Once these characteristics are known, the choice of the particular adsorbent or mixture of adsorbents to be used and having polar properties closest to those of the impurities, is a wholly mechanical step, although guided by theory. In making such determinations as to the character of the contaminating material or the adsorbent to be added, tests of resistivity, dielectric constant, dielectric strength, index of refraction and other physical properties will be made and are useful in determining the kinds and amounts of impurities present in the oily material, and the kind and amount of adsorbent materials to be employed.

The adsorbent materials which we prefer to add to the oily material to accomplish the contact adsorption may be either liquids insoluble in the oil, or solids in finely divided state. These may be added to the oil in sufficient quantity to adsorb completely the impurities present therein, or in sufficient quantity only to partially adsorb the impurities, as will be hereinafter set forth. In effecting intimate contact between the adsorbent and the contaminating substances, the oil is preferably subjected to mechanical or other agitation subsequent to or at the time of the addition of the contact adsorbent. This accomplishes an effective dispersion of the adsorbent in the oil. In addition the oil may, if desired, be heated in order to facilitate and accelerate the adsorption process.

In addition, certain electromagnetic stresses may be impressed upon the oil to control the activity of the ions and polar molecules. In this connection, adsorption is a phenomenon dependent upon the inter-relation of the electromagnetic fields of the adsorbent and adsorbate. Thus, electromagnetic stresses may be externally applied for the purpose of accentuating and directing these internal fields so as to facilitate, accelerate, and make more complete the removal of the undesirable constituents. Thus, in many instances, superior results are obtained by allowing the adsorption to proceed in an electromagnetic field whereby the inter-relation of the internal electromagnetic fields of adsorbent and adsorbate is altered so as to facilitate and accelerate adsorption. Any suitable means may be utilized for setting up this external electromagnetic field. Further, in other instances we have found it desirable to allow the adsorption process to proceed during exposure to light rays, especially when a semi-transparent oily liquid is being treated. The light rays used for such purposes should, for effective results, contain or consist of wave lengths for which the liquid being treated shows strong lines in its absorption spectrum. This requirement will determine the type of light source employed.

If the process of our invention is applied to the purification or repurification of dielectric oil, experiments have shown that the undesirable substances which must be removed are ions or ionizable substances, i. e., polar materials which are to be removed from a non-polar oil. Thus, following the teachings set forth above, we add to the dielectric oil an adsorbent composed of a polar material or a mixture of polar materials. Examples of such polar materials are activated carbon, silica, water or brine, sulphide minerals, metallic oxides, etc.

Considering, for purpose of illustration, that a dielectric oil is being purified by the herein-disclosed process, we have found it desirable in some instances to use a two-step process. The first step includes the use of a liquid adsorbent such as water or other liquid adsorbent of a polar nature which is substantially insoluble in and substantially non-miscible with the oil to be purified, this liquid being intimately admixed with the oil by any suitable agitating means and subsequently removed without resolution of the emulsion, after adsorption has been completed. The second step in this embodiment of our process has for its purpose the removal of the traces of water which will inevitably dissolve in the oil and which would render it useless for dielectric purposes. This step may include intimately admixing a solid adsorbent comprising a polar material or mixture of polar materials. In the first step, and wherein a liquid adsorbent is added, the agitation must be carried to such an extent that an emulsion is formed. The emulsion thus formed is then separated from the oil and this oil may be removed from the particular tank in which the agitation has been effected to another tank in which a suitable solid adsorbent is added. Following the second step, wherein this solid adsorbent is intimately admixed with the dielectric oil, the adsorbent and the impurities adsorbed thereby may be removed by a simple process of filtration, using ordinary filter paper. Such a dual-step process, under some conditions and with many oils, yields superior results to a single treatment with a solid adsorbent.

In other instances, it is entirely practical to utilize a single-step process in which a solid adsorbent of a polar nature is added to the dielectric oil, and, after the lapse of a sufficient time of contact to permit the desired degree of adsorption, the solid adsorbent and its adsorbed substances may be filtered from the dielectric oil by the use of ordinary blotting paper, or by the use of other simple filtering devices.

Both the single-step and the dual-step processes above mentioned are clearly applicable in the treatment of other oily materials including contaminating substances of a polar nature which it is desired to remove.

Another method of procedure, which is particularly applicable to the purification of deteriorated dielectric oil, but which can also be used in the processing of dielectric oil when it is first being manufactured, or with other types of oily materials including contaminating substances, involves the production of the adsorbent in situ in the oil itself. Considering, for instance, the treatment of a deteriorated dielectric oil, it is often desirable to use an adsorbent material, such as finely divided carbon. We have found that this can be conveniently produced in situ in the oil by partial decomposition of the oil as a result of the maintenance of an electric arc therein. Thus, if a pair of carbon electrodes is positioned beneath the surface of a deteriorated dielectric oil, and a suitable electric arc is formed between these electrodes by any well known means, a certain amount of carbon will be formed from the decomposition of the oil. In addition a certain amount of carbon results from the disintegration of the carbon electrodes themselves. While it is in some instances possible to use metallic electrodes, this is usually undesirable in view of the fact that these electrodes will themselves become to some extent disintegrated, thus introducing finely divided metallic impurities into the oil which must be subsequently removed. In other instances it is possible to use carbon electrodes in which other polar materials are embodied, thus not only obtaining carbon particles from the disintegration of the carbon in the electrodes and from the decomposition of the oil, but in addition forming finely divided polar materials due to the disintegration of the polar substances associated with the carbon electrodes.

In many respects this method of purification wherein an arc is formed in the oily material is of particular advantage inasmuch as the constituents of the oil which most easily undergo decomposition are precisely those which tend to cause break-down of the oil when employed under high electrostatic stress. It will thus be appreciated that this process offers a very powerful method for removal of reactive components of the oil.

As an example of this embodiment of the process, we have found that a deteriorated oil which had a dielectric strength of less than 7.5 kilovolts across a 0.1 inch gap could be brought up to 20 kilovolts by merely holding an arc in the oil until the carbon resulting from decomposition had completely blackened it. The amount of carbon so formed is ordinarily small, in this test being estimated at less than $\frac{1}{10}$ of 1%. In this test the carbon was allowed to remain in contact with the contaminated oil for a period somewhat less than two hours, this prolonged contact taking place after arcing had been completed. Thereafter the carbon was removed by simple filtration, using ordinary filter paper. The product produced was a dielectric oil having a breakdown value of 20 kilovolts across the standard 0.1 inch gap.

In other instances it may be desirable to supplement these steps of arc formation and prolonged contact with the resulting carbon by treating the resulting product with anhydrous finely divided silica or other solid adsorbent, in order to remove polar non-hydrocarbon impurities. In other instances it is possible to add this solid adsorbent to remove the non-hydrocarbon impurities after the carbon particles have been filtered from the oil. Thus, in the above mentioned test, the oil was brought up to a dielectric strength of 30 kilovolts across the same gap by adding thereto, after filtration, a small amount of anhydrous finely divided silica.

The second factor, and usually the most important, involved in our process relates to the length of time during which the adsorbent is maintained in contact with the oily material to be purified. Heretofore in adsorption processes the particular adsorbent utilized has been empirically selected without regard to the particular relationships set forth above which we have found to exist, these adsorbents being kept in contact with the material as long as is commercially practical. Not only are greatly superior results obtained by selecting the adsorbent by the use of the principles set forth above, but in addition we have found that the time of contact is a material factor in efficient treatment. Thus, our experiments show that many oily materials contain polar material of a contaminating nature, this polar material sometimes being in the form of ionized impurities or in the form of polar molecules. In other instances the contaminating material includes a mixture of ionized material and polar molecules.

In illustrating this time factor, let us consider the action which takes place when an adsorbent is added to the oil containing contaminating materials consisting of both ionized materials and polar molecules. Our experiments definitely show that when a suitable adsorbent is added to such a mixture, the ionized impurities are very rapidly and completely adsorbed on the adsorbent material, being adsorbed at a rate so much faster than is characteristic of polar molecules as to make the adsorption almost entirely ionic. Stated in other words, the addition of a suitable adsorbent to such a mixture will quickly adsorb the ionized impurities, but the adsorption of the polar molecules will progress at a very much slower rate. As the ionized impurities are removed it will be clear that the resistivity of the oil will increase. In many instances we have found it desirable to remove the adsorbent after the ionic material has been substantially completely adsorbed, and before material adsorption of the polar molecules has taken place, thus removing the adsorbent when the resistivity is a maximum. In many instances the adsorbent can be removed after a few minutes of contact, at which time almost complete removal of the ionic materials will have been accomplished. In other instances the time required for this ionic adsorption is somewhat greater but seldom exceeds a period of a few hours. Thus, our process may include the intimate admixing of an adsorbent material to the oil and the subsequent removal of this adsorbent from the oil, as by filtration or other means, after which an additional amount of fresh adsorbent material, either the same or different from that previously used, is added. This additional amount of fresh adsorbent material acts to adsorb the polar molecules and thus decrease the dielectric constant of the oil, and ordinarily the time of contact in this instance is considerably longer than the time involved in the preliminary adsorption which removes the ionic material. This second adsorption step may be prolonged for a period of several hours, or even several days in some cases. The resulting products are much superior to those which would be obtained if a single-step process were used, the adsorbent being allowed to remain in contact with the oil for a length of time substantially equal to or greater than the time involved in the second stage of the two-step process above described. If such a single-step process is utilized, complete removal of the ionic material and polar molecules may or may not be accomplished according to the nature of the adsorbent material employed. In addition, it has been found in some instances that while such a single-step adsorbent process will quickly adsorb the ions thus bringing the resistivity to a maximum, these ions will later be displaced by polar molecules and will return to the oil to again reduce the resistivity. Thus, the final product will contain some or all of its original content of ionic materials, and the prolonged contact will only remove the polar molecule materials to produce an oil of low dielectric constant, thereby necessitating further treatment in order to remove the ionic material and again raise the resistivity. It will thus be apparent that the length of time that the adsorbent is in contact with the oil is very important, and that if the preliminary adsorption is allowed to proceed only for a sufficient length of time to adsorb the ionic impurities, the displacement of the ionic materials which would otherwise take place upon prolonged contact is prevented.

In other instances, however, we have found that satisfactory results are obtained by such a two-step adsorption process if the preliminary adsorbent is kept in contact with the oil for a longer time than is the fresh adsorbent subsequently added. Thus a time of contact of the first added adsorbent of several hours or more will not only adsorb the ions, but may also displace at least a portion of these ions by polar molecules. A time of contact of the later-applied adsorbent of several hours or less will often give a very desirable product. It will thus be understood that our process is not limited to a preliminary adsorption step which is carried out for a length of time less than the subsequent adsorption step. For instance, as an example of the performance of this conception of our process, a certain deteriorated transformer oil which showed a dielectric strength of less than 7.5 kilovolts tested in a test cup including a standard 0.1" gap, was mixed with approximately 1% by weight of activated carbon. Adsorption was permitted to proceed for 24 hours, which was sufficient time with this dielectric oil for the polar molecule content to substantially reach a minimum after at least partial replacement of the previously adsorbed ionized materials after which the carbon was removed by filtration through an ordinary laboratory filter funnel. The oil was then tested and was found to have a dielectric strength of 22.5 kilovolts. Another portion of this oil, from which the carbon had not been removed, was allowed a further adsorption period of 24 hours without adding additional adsorbent, after which it was similarly filtered and tested, the product showing a dielectric strength of approximately 25 kilovolts. However, still another portion of the oil from which the carbon had been filtered after the first 24 hour treatment was treated with 1% of fresh carbon and was allowed an adsorption time of approximately four hours, after which it was filtered and tested. The product showed a dielectric strength in excess of 30 kilovolts, thus indicating that much superior results are obtained by a two-step process than is present with a single-step process, not to mention the saving in time involved.

It will be clear then that our process is particularly applicable to the purification of an oily material containing water or other adsorbable substances in solution. Our process differs from prior processes in several respects, including the steps of selecting the adsorbent with respect to the material to be adsorbed, utilizing the principles set forth above, and including the step of controlling the adsorption time. While the above examples have been set forth as applied to the purification of dielectric oil, it will be further understood that our process is not limited thereto, but can be used in the purification of other oily materials, such, for instance, as edible oils, lubricating oils, medicinal oils, etc.

The selective removal of the impurities according to the kind of adsorbent employed, and according to the time and conditions permissible to secure the desired products, is also an important factor of the present invention. So also, an important feature of certain of the methods herein disclosed is the multiple subjection of the material to be purified to the action of the same or different adsorbents to accomplish such selective removal of impurities. Finally, the features of the process wherein adsorption is facilitated by the application of heat, exposure to light, or to electric or other stresses are auxiliary factors of importance in many phases of the process. Another important factor of the present process is the removal of the absorbent material, together with the adsorbed impurities, either at intervals during the process or at the end of the total adsorption period, by simple filtration, sedimentation or other suitable means.

While we have particularly described the invention in conjunction with batch-process operation, it will be clear that in many instances it is possible to use these principles in a continuous process. Also it is often possible to reuse the adsorbent by suitable treatment to remove the impurities adsorbed thereby, as well as to recover the separated impurities for suitable use.

We claim as our invention:

1. A method of purifying an oily material including a liquid phase of oil containing polar substances of a contaminating nature, which method includes the steps of: intimately mixing with said oily material a substance of high polar moment and substantially insoluble in said liquid phase, whereby said substance of high polar moment preferentially adsorbs from said liquid phase said contaminating polar substances; subjecting the mixture to the action of an electromagnetic stress during the adsorption period, said substance of high polar moment being allowed to remain in contact with said oily material for a time sufficient to effect substantial adsorption; and removing said substance of high polar moment and its adsorbed polar substances from said liquid phase.

2. A method of purifying an oily material including a liquid phase of oil containing ionized materials and polar molecules, which method includes the steps of: adding to said oily material an adsorbent capable of adsorbing both said ionized materials and said polar molecules and adsorbing said ionized materials at a faster rate than said polar molecules, but which upon prolonged contact will cause at least a portion of the adsorbed ionized materials to be replaced by polar molecules and be returned to the oily material;

determining when the content of said ionized material in said oily material is substantially a minimum; removing said adsorbent with its adsorbed material when said content is substantially a minimum adding a fresh adsorbent material to the oily material from which said ionized materials have been removed and allowing a more prolonged time of contact therebetween than used to effect said adsorption of said ionized materials, whereby said fresh adsorbent adsorbs said polar molecules; and removing said fresh adsorbent and its adsorbed polar molecules from said liquid phase.

3. A method of purifying a dielectric oil including a liquid phase of oil containing ionized materials and polar molecules, which method includes the steps of: intimately mixing with said dielectric oil an adsorbent capable of adsorbing both said ionized materials and said polar molecules and adsorbing said ionized materials at a faster rate than said polar molecules, but which upon prolonged contact will cause at least a portion of the adsorbed ionized materials to be replaced by polar molecules and be returned to the oil; allowing said adsorbent material to remain in contact with said dielectric oil until substantially all of said ionized materials have been adsorbed and until after at least a portion of the ionized materials thus adsorbed have been replaced by polar molecules, said adsorption being carried on for a period of time of several hours or more; determining when the content of said polar molecules in the oil is substantially a minimum; removing the adsorbent and its adsorbed substance from the dielectric oil when said content has substantially reached a minimum; subsequently adding a fresh adsorbent material to the resulting dielectric oil to remove said ionized materials replaced by said polar molecules, this adsorption period being prolonged for a period of several hours or less; and subsequently removing said fresh adsorbent and its adsorbed materials from said dielectric oil.

4. A method of purifying a dielectric oil containing contaminating substances of a polar nature, which method includes the steps of: establishing an electric arc beneath the surface of said dielectric oil whereby a portion of said oil is broken down to form carbonaceous material in situ which adsorbs said polar materials that portion of said dielectric oil thus broken down being the portion thereof which causes break-down of said dielectric oil when subjected to high electrostatic stress; and filtering said carbonaceous material and its adsorbed polar materials from said dielectric oil only after said carbonaceous material has remained in contact with said dielectric oil a sufficient time to adsorb a substantial portion of said contaminating substances of a polar nature.

5. A method of purifying a dielectric oil containing contaminating substances of a polar nature, which method includes the steps of: forming an electric arc beneath the surface of said dielectric oil by the use of a pair of electrodes containing carbon, whereby a partial decomposition of said dielectric oil takes place in said arc to form a carbonaceous material and whereby partial disintegration of said carbon in said electrodes takes place, said carbonaceous material and said material disintegrated from said carbon electrodes forming an adsorbent in situ in said dielectric oil, said adsorbent acting to adsorb the polar materials in said dielectric oil; and subsequently removing said adsorbent and its adsorbed impurities from said dielectric oil.

6. A method of purifying a dielectric oil containing contaminating substances of a polar nature, which method includes the steps of: forming a carbonaceous material in situ in said dielectric oil, said carbonaceous material being allowed to remain in contact with said dielectric oil until said material has adsorbed said substances of a polar nature; and removing said carbonaceous material and its adsorbed substances of a polar nature from said dielectric oil.

7. A method of purifying a dielectric oil containing contaminating substances of a polar nature by the use of electrode means formed of carbon and embodying other material of a polar nature, which method includes the steps of: establishing an electric arc between said electrodes to partially disintegrate said electrodes to liberate carbon particles and particles of said other material of polar nature; subjecting said dielectric oil to said arc to decompose a portion of said dielectric oil to form carbon particles in situ, said carbon particles formed by said decomposition and by said disintegration together with said distintegrated particles of polar nature acting as adsorbents to adsorb said contaminating substances in said dielectric oil; and removing said adsorbents and said adsorbed contaminating substances from said dielectric oil.

8. A method of purifying an oily material including a liquid phase of oil containing polar substances of a contaminating nature, which method includes the steps of: intimately mixing with said oily material a substance of high polar moment and substantially insoluble in said liquid phase whereby said substance of high polar moment prefentially adsorbs from said liquid phase said contaminating polar substances; subjecting the mixture to light rays containing wave lengths for which said dielectric oil shows strong lines in its absorption spectrum; and removing said substance of high polar moment and its adsorbed polar substances from said liquid phase.

9. A method of purifying oily substances including a liquid phase containing ionized materials and materials consisting of polar molecules, which method includes the steps of: adding to said oily substance an adsorbent capable of adsorbing both said materials and adsorbing said ionized materials at a greater rate than said polar molecules but which upon prolonged contact will cause at least a portion of the adsorbed ionized materials to be replaced by polar molecules and returned to the oily substance, whereby the contents of ionized materials and polar molecules in the oily substance are at a minimum at different times; determining when said content of one of said materials in said oily substance is a minimum; removing said adsorbent along with its adsorbed materials from said oily substance when said content of one of said materials is substantially a minimum; adding fresh adsorbent to said oily substance to adsorb the other of said materials; and removing said fresh adsorbent and its adsorbed materials from the oily subtance.

CLAUDIUS H. M. ROBERTS.
RALPH L. BELSHE.

CERTIFICATE OF CORRECTION.

Patent No. 2,067,345.

January 12, 1937.

CLAUDIUS H. M. ROBERTS, ET AL.

It is hereby certified that error appears in the printed specification of the above numbered patent requiring correction as follows: Page 5, first column, line 5, claim 2, after the word "minimum" insert a semicolon; line , claim 3, for "substance" read substances; and that the said Letters Patent should be read with these corrections therein that the same may conform to the record of the case in the Patent Office.

Signed and sealed this 2nd day of March, A. D. 1937.

Henry Van Arsdale
Acting Commissioner of Patents.